United States Patent
Cho et al.

(10) Patent No.: US 7,929,758 B2
(45) Date of Patent: Apr. 19, 2011

(54) METHOD AND DEVICE FOR ADJUSTING IMAGE COLOR IN IMAGE PROJECTOR

(75) Inventors: Sung-Dae Cho, Yongin-si (KR); Sang-Wook Oh, Ansan-si (KR); Chang-Sup Shim, Seoul (KR); Yun-Je Oh, Yongin-si (KR)

(73) Assignee: Samsung Electronics Co., Ltd., Maetan-Dong, YeongTong-Gu Suwon-Si, Gyeonggi-Do, Korea (KR)

( * ) Notice: Subject to any disclaimer, the term of this patent is extended or adjusted under 35 U.S.C. 154(b) by 1146 days.

(21) Appl. No.: 11/639,969

(22) Filed: Dec. 15, 2006

(65) Prior Publication Data

US 2007/0154086 A1   Jul. 5, 2007

(30) Foreign Application Priority Data

Dec. 29, 2005   (KR) .......................... 10-2005-0133775

(51) Int. Cl.
*G06K 9/00* (2006.01)
(52) U.S. Cl. ........................................ 382/167; 382/274
(58) Field of Classification Search ................... 382/162, 382/167, 274
See application file for complete search history.

(56) References Cited

U.S. PATENT DOCUMENTS

| | | | | |
|---|---|---|---|---|
| 7,460,270 B2 * | 12/2008 | Stokes et al. | ................... | 358/1.9 |
| 7,714,942 B2 * | 5/2010 | Kong et al. | ................... | 348/744 |
| 2004/0212783 A1 * | 10/2004 | Wada | .............................. | 353/31 |
| 2005/0179775 A1 * | 8/2005 | Rodriguez et al. | .............. | 348/97 |

FOREIGN PATENT DOCUMENTS

| | | |
|---|---|---|
| CN | 2692734 | 4/2005 |
| JP | 2005-191930 | 7/2005 |
| KR | 10-188193 | 1/1999 |

* cited by examiner

*Primary Examiner* — Phuoc Tran
(74) *Attorney, Agent, or Firm* — Cha & Reiter, LLC

(57) ABSTRACT

Disclosed are methods and devices for adjusting an image color in an image projector. In one aspect, the method for adjusting an image color in an image projector, includes the steps of obtaining information on an external image projection environment to determine color conversion information for adjusting the color of a projection image and converting the color of an image to be projected using the determined color conversion information to project the image. The device for adjusting a projection image color in a mobile communication terminal provided with an image projector, includes an image projector for performing an image projection function under the control of a controller, a camera for performing a camera function under the control of the controller; and the controller for obtaining color information of an external screen on which an image is projected through the camera, and adjusting the color of an image to be projected onto the image projector using the color information.

18 Claims, 8 Drawing Sheets

METHOD AND DEVICE FOR ADJUSTING IMAGE COLOR IN IMAGE PROJECTOR

CLAIM OF PRIORITY

This application claims the benefit of the earlier filing date, pursuant to 35 USC 119, to that patent application entitled "Method and Device for Adjusting Image Color in Image Projector," filed with the Korean Intellectual Property Office on Dec. 29, 2005 and assigned Serial No. 2005-133775, the contents of which are incorporated herein by reference.

BACKGROUND OF THE INVENTION

1. Field of the Invention

The present invention relates to an image projector and a display device, and more particularly to a method and a device for adjusting the color of an image when the image is projected to the outside through an image projector.

2. Description of the Related Art

A device having the function of projecting an image can project the image in a direction and place specified by a user. The image projecting device, typically, displays image data stored in a memory or image signals input through an image input terminal on a screen. The place on which an image can be displayed in such a manner may be anything desired by the user. For example, an image is formed may be formed on white wall or a plane with an arbitrary color that is used as a screen.

Generally, the device provided with the image projecting function has an object to reproduce and project color information of each pixel constituting an image to be displayed as it is. For example, assuming that the image is to be displayed using RGB color information, and the color of a specific pixel is [255,0,0], the image projecting device displays a color corresponding to the color [255,0,0] as it is at the position of the pixel. This is a basic function of a display device, and a general image projector is also manufactured to follow such a function.

However, in a case of an internal display device such as a Liquid Crystal Display (LCD), the screen on which an image is formed is a part of the internal display device, and such a screen is manufactured to express the image clearly when it is generally manufactured. However, the image projector does not include a screen on which an image is generally displayed as a part of the device. In this case, the image projected by the image projector is changed depending on a working environment. For example, if the color of a screen on which an image is displayed is a green [0,255,0] system when it is assumed that an image of red [255,0,0] is displayed using the image projector, the red image does not appear red but yellow [255, 255,0]. That is, the image may be shown in another color because of the influence of the color of the screen. Further, the color of a displayed image may be shown to be changed, or the distinction of the color may be shown to be different depending on a surrounding light source.

As such, the image projector generally projects an image to the outside of a corresponding device, and has a characteristic different from the internal display device, such as an LCD. The internal display device can facilitate required settings, and effectively display the color of an image using the values of the settings. However, in an external display device, such as the image projector, the color of an image is greatly influenced by environments where the image is projected, e.g., the brightness of an external light source, the color of a screen and the like. Such projection environments generally have a negative influence on the quality of a projected image. If an image is projected in the same manner as in the internal display device without processing of the projection environments, the quality of the projected image is lowered.

SUMMARY OF THE INVENTION

Accordingly, the present invention has been made to solve the above-mentioned problems occurring in the prior art and provides additional advantages, by providing a method and a device for adjusting an image color in an image projector, wherein a color is corrected depending on a projection environment.

It is another aspect of the present invention to provide a method and a device for adjusting an image color in an image projector, which enables an image with a color configuration desired by a user to be obtained.

In one embodiment, there is provided a method for adjusting an image color in an image projector, which includes the steps of obtaining information on an external image projection environment to determine color conversion information for adjusting the color of a projection image and converting the color of an image to be projected using the determined color conversion information to project the image.

According to another aspect of the present invention, there is provided a device for adjusting a projection image color in a mobile communication terminal provided with an image projector, which includes an image projector for performing an image projection function under the control of a controller, a camera for performing a camera function under the control of the controller and a controller for obtaining color information of an external screen on which an image is projected, and adjusting the color of an image to be projected onto the image projector using the color information.

BRIEF DESCRIPTION OF THE DRAWINGS

The above features and advantages of the present invention will be more apparent from the following detailed description taken in conjunction with the accompanying drawings, in which.

DETAILED DESCRIPTION

Figure 1:
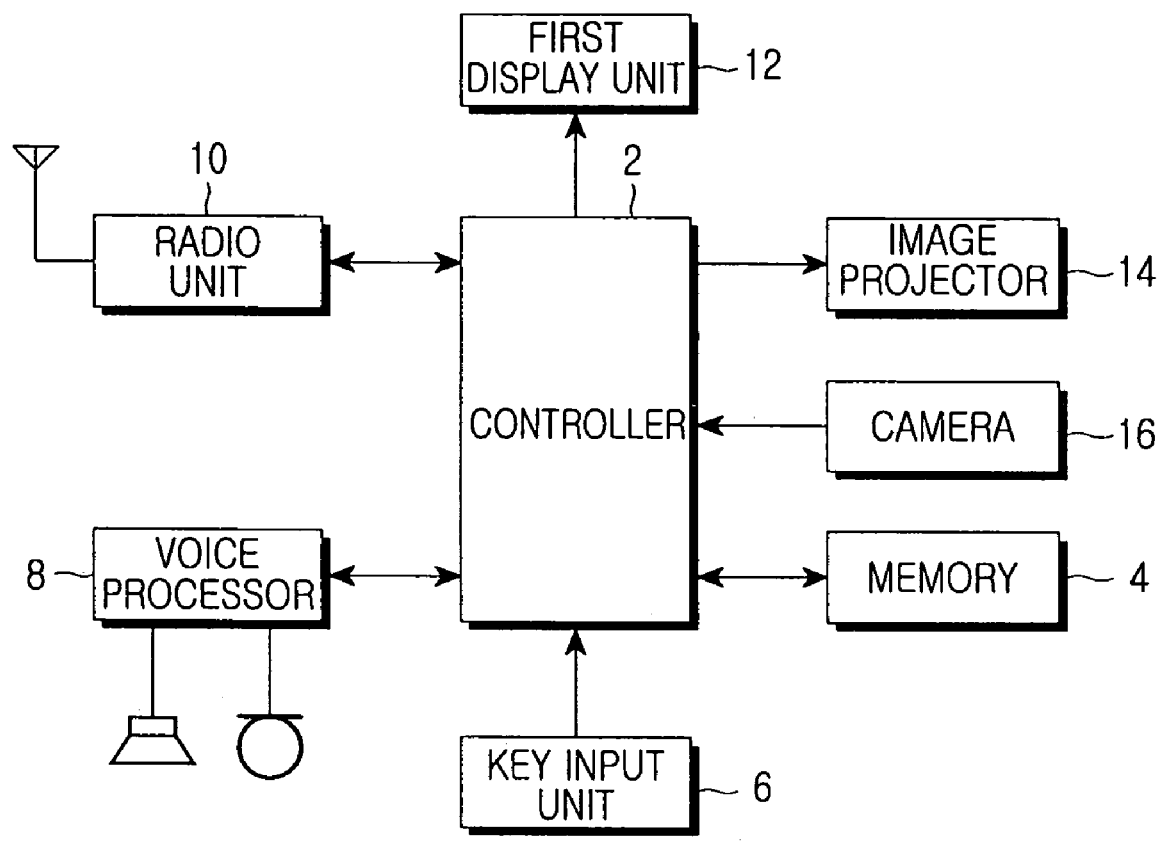
FIG. 1 is a block diagram showing an exemplary configuration of a mobile communication terminal provided with an image projector according to a first embodiment of the present invention.

Hereinafter, embodiments of the present invention will be described with reference to the accompanying drawings. In the following description, the same elements will be designated by the same reference numerals although they are shown in different drawings. Further, for the purposes of clarity and simplicity, a detailed description of known functions and configurations incorporated herein will be omitted as it may make the subject matter of the present invention rather unclear.

FIG. 1 is a block diagram showing an exemplary configuration of a mobile communication terminal provided with an image projector according to a first embodiment of the present invention. In the first embodiment of the invention, the mobile communication terminal, among various devices with image projectors, as shown in FIG. 1, will be described as an example.

Referring to FIG. 1, the mobile communication terminal, according to this first embodiment of the present invention, includes a controller 2, a memory 4, a key input unit 6, a voice processor 8, a radio unit 10, a first display unit 12, an image projector 14 and a camera 16.

The key input unit 6 is a device for receiving characters input from a user, e.g., telephone numbers. Further, the key input unit 6 includes keys for inputting numeral and character information and function keys for setting various kinds of functions, and provides their input signals to the controller 2. The first display unit 12 is preferably an internal display device of the mobile communication terminal, and may be configured as a display device such as a Liquid Crystal Display (LCD). Further, the first display unit 12 performs the function of outputting image output signals input (i.e., received) from the controller 2 onto a screen.

The radio unit 10 converts a user's voice and control data into a radio signal to transmit it to a base station (not shown) of a mobile communication network, and receives the radio signal from the base station to convert it into the voice and control data and to output them. The voice processor 8 decodes the voice data received from the radio unit 10 and outputs it as audible sounds through a speaker, and converts a user's voice signal input from a microphone into data to output it to the radio unit 10 under the control of the controller 2.

The camera 16 performs the general digital camera function of the controller 2, and converts a visible image signal input from an external subject into digital image data with an appropriate format. The image projector 14 is a device configured such that the function of a general projector can be performed in the mobile communication terminal, and may include a light source, a permeable display device, a lens and the like. The image projector 14 projects a projection image output signal received from the controller 2 to the outside.

The controller 2 controls the operation of each of the functional units to perform the function of controlling the operation of the mobile communication terminal. That is, the controller 2 performs a process in accordance with a numeral input through the key input unit 6 and a menu selection signal, and receives an external image signal input through the camera 16 to perform a process in accordance therewith. Further, the controller 2 outputs image output signals required for various operations, including a camera photographing image, using the first display unit 12 or the image projector 14. At this time, the controller 2 reads output content stored in the memory 4, or stores the content in the memory 4, if necessary. The memory 4 stores a plurality of programs and data related to the operation of the controller 2. Further, the memory 4 may be used to store information required for the use of the mobile communication terminal and camera photographing image information.

The mobile communication terminal provided with such a configuration performs general operations related to mobile communication services including a camera function, and performs the image projection function related to the present invention through the image projector 14. As an example of the technique related to a mobile communication terminal provided with such an image projector, there is disclosed Korean Patent Application No. 2004-29693 (title: Portable Terminal Having Image Projector and Control Method thereof, inventor: Kim, Seong Gu, application date: Apr. 28, 2004) having been previously filed by the present inventor, which is incorporated by reference herein.

Meanwhile, in the mobile communication terminal according to the present invention, the controller 2 additionally performs an image color adjustment operation in the image projection operation. Moreover, the memory 4 additionally stores a program(s) related to the image projection operation of the controller 2 and relative information for color adjustment according to the features of the present invention, and outputs the relative information to the controller 2, if necessary. An image color adjustment operation, according to the present invention, will be described in more detail below with reference to the accompanying drawings.

Figure 2:
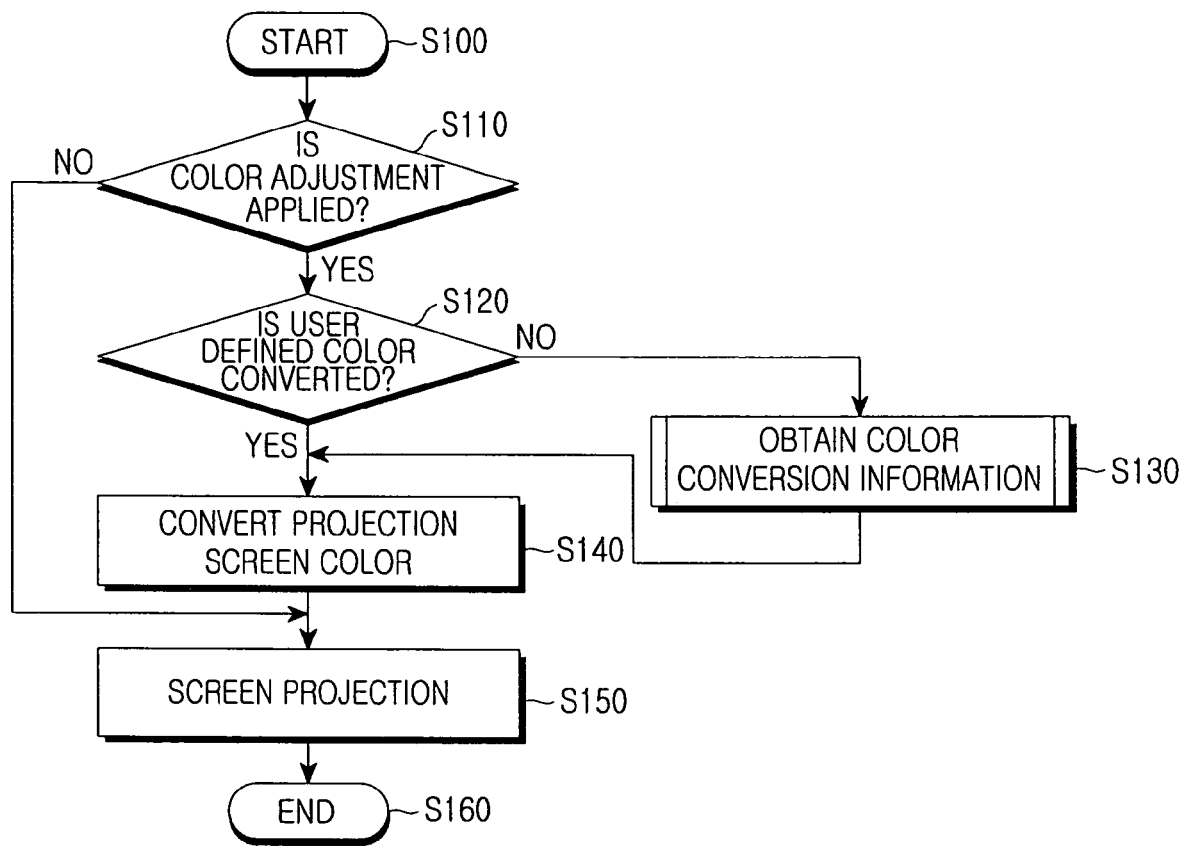
FIG. 2 is a flowchart illustrating an image color adjustment operation of the image projector according to the first embodiment of the present invention.

FIG. 2 is a flowchart illustrating an image color adjustment operation of the image projector according to the first embodiment of the present invention. Although such an image color adjustment operation may be configured to be executed by selection of an item called "projection image color adjustment" appropriately added according to the features of the present invention in menu items for setting various functions generally provided to a mobile communication terminal, a configuration automatically executed of the image color adjustment operation is shown as an example in FIG. 2.

Referring to FIG. 2, if an image projection operation is performed (step S100), the controller 2 determines whether or not an image color adjustment operation, according to the features of the present invention, is applied at step S110. The present invention may be configured such that a menu item called "projection image color adjustment operation", according to the features of the present invention, is provided in the menu items for setting various functions of the mobile communication terminal, and the setting for the presence of executing and/or canceling the selected function is established by a user. Accordingly, the controller 2 can determine whether or not an image color adjustment operation is applied by identifying a setting value for the presence of executing/canceling the projection image color adjusting operation at step S110. If it is determined that the image color adjustment operation is not applied, the controller 2 proceeds to S150 to perform a general image projecting operation. If it is determined that the image color adjustment operation is applied, the controller 2 proceeds to S120.

The controller 2 determines whether or not user defined color adjustment is performed at step 120. The presence of performing the user defined color adjustment at step S120 may be accomplished by identifying a setting value for the presence of executing/canceling in an additional corresponding menu item that was previously provided. At this time, when the color adjustment operation is not set, the controller 2 converts the color of an image to be projected using color adjustment information having been previously set at step S140, and then performs image projection operation at step S150. In one aspect, the color adjustment information is user defined. Meanwhile, if it is determined that the color adjustment operation is to be performed at step S120, the controller 2 proceeds to step S130 to perform the operation of obtaining color conversion information (color conversion formula) according to the features of the present invention. That is, if the user defined color conversion information determined in step 120 is information that a user defines, then the color conversion in step S130 is obtained by putting the actual projected image again according to the features of the present invention. Thereafter, at step S140, the controller 2 converts the color of the image to be projected in accordance with the color conversion information obtained at step S130.

In a process of setting color conversion information, the setting value of a color initially input may be displayed and the user may adjust the setting value of the color.

Further, a plurality of sets of setting values of colors capable of representing a user's taste, such as the setting for a favorite or preference color, may be provided to be displayed, and one of the sets of the settings for various favorite or preference colors may be selected by the user. Besides, color setting information provided such that an appropriate color correction is accomplished with respect to various projection environments (e.g., low-power driving, surrounding brightness, and the like) may be displayed, and one of the displayed color settings may be selected by the user.

Through such an operation, the color adjustment of a projection image, according to the present invention, can be perform according to not the projection environments but a user's request. The color of an image can be adjusted and projected using color conversion information capable of adjusting the color of an projection image to a user's preference color, color conversion information for the low-power driving capable of reducing the consumption power of the image projector and preventing the degradation effect of generated image quality, color conversion information arbitrarily set by the user, or the like. For example, in a case where the user desires a skin color to be darker than the color currently seen, a setting for emphasizing the skin color is performed through a color setting menu, and the set skin color value then allows the skin color existing in the image to be projected by adjusting it to be dark through the color conversion information.

Further, in the operation of obtaining the color conversion information at step S130, the color of a screen region on which an image is projected may be obtained through the camera, and using an appropriate color conversion information, the projected image colors adjusted accordingly. Besides, a projected image may be obtained by the camera, and the color conversion information may be determined using the obtained projection image and the color of the image having been projected. Such an operation of obtaining the color conversion information will be apparently understood from the following descriptions for various embodiments.

Figure 3:
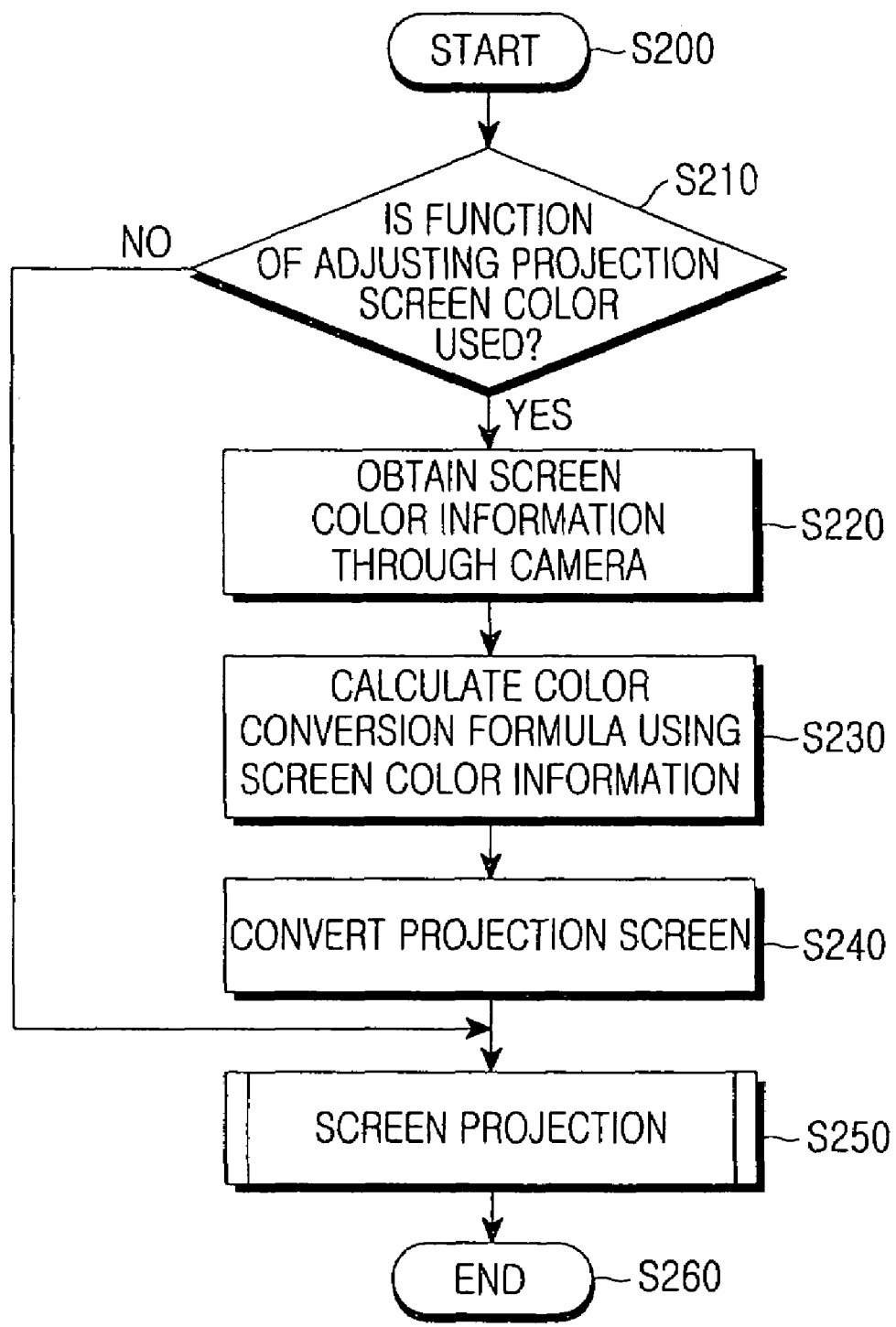
FIG. 3 is a flowchart illustrating an image color adjustment operation of an image projector according to a second embodiment of the present invention.

FIG. 3 is a flowchart illustrating an image color adjustment operation of an image projector according to a second embodiment of the present invention, in which a screen color information can be obtained by using a camera, and the image color adjustment is carried out using the obtained screen color information. In FIG. 3, a configuration in which an image projection operation is automatically executed is illustrated as an example. Referring to FIG. 3, when an image projecting operation is first performed (step S200), the controller 2 determines whether or not a projection image color adjustment operation is applied. At step S110 of FIG. 2, the controller 2 determines whether or not an image color adjustment operation is applied by identifying a setting value for the presence of executing/canceling the projection image color adjusting operation, which has been previously stored. If it is determined that the image color adjustment operation is not applied, the controller 2 proceeds to S250 to perform a general image projecting operation. However, when it is determined that the image color adjustment operation is applied, the controller 2 proceeds to S220.

At step S220, the controller 2 obtains color information on a projection region, such as a screen or wall on which an image will be projected, before projecting it. At this time, the camera should be positioned at a proper photographing position so as to photograph a projection image. To this end, the controller 2 may perform an operation of outputting a guidance message to inform the user of positioning the camera at the proper position, such that the camera can rotate or move, before performing step S220 in the mobile communication terminal implemented. Further, a hardware configuration of the image projector and the camera may be implemented in the same (rotatable or movable) housing such that the image projecting position of the image projector and the photographing position are always the same.

After having performed step S220, the controller 2 evaluates color conversion information using the screen color information having been obtained in such a manner at step S230, and then converts the color of the projection image in accordance with the color conversion information at step S240. Thereafter, the controller 2 proceeds to step S250 to perform an operation of projecting the image of which color is converted (adjusted). For example, in a case where the screen color information is yellow, blue [B] may be more reinforced in the screen color information as compared with yellow [R+G] when projecting the image.

Figure 4:
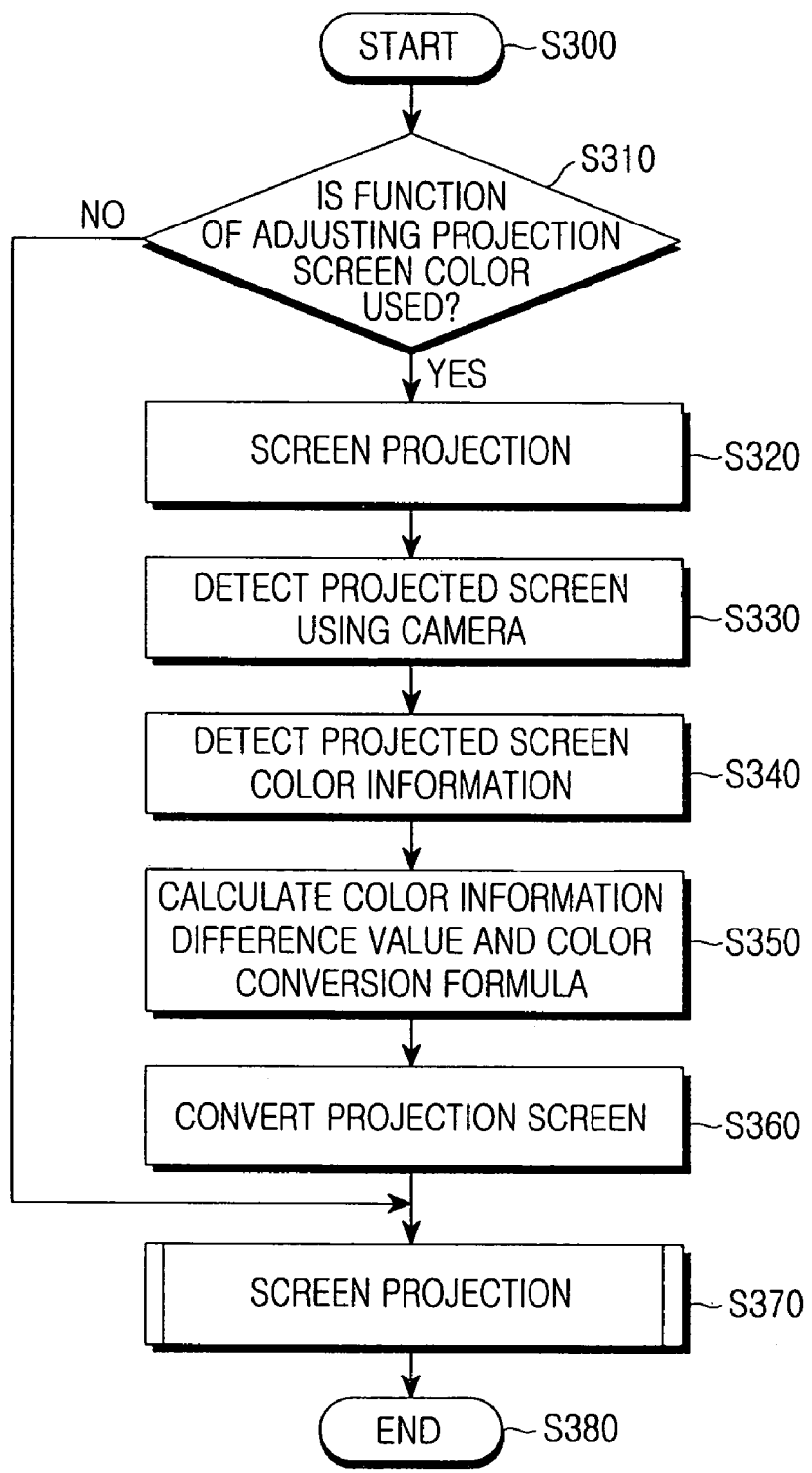
FIG. 4 is a flowchart illustrating an image color adjustment operation of an image projector according to a third embodiment of the present invention.

FIG. 4 is a flowchart illustrating an image color adjustment operation of an image projector according to a third embodiment of the present invention, in which the color information of an image projected on a real screen is obtained using a camera, and the obtained color information is compared with that of an original image, so that projection image color conversion information can be obtained, and thus the color of an projection image can be converted (adjusted). Referring to FIG. 4, if an image projection operation is first performed (step S300), the controller 2 determines whether or not an image color adjustment operation is applied by identifying a setting value for the presence of executing/canceling the projection image color adjusting operation, which has been previously stored at step 310. When it is determined that the image color adjustment operation is not applied, the controller 2 proceeds to S370 to perform a general image projecting operation. When it is determined that the image color adjustment operation is applied, the controller 2 proceeds to S320.

At step S320, the controller 2 projects a real image or preset color test image. Then, the controller 2 receives an image signal containing the projected image using the camera, and detects a projection image region in the image signal at step S330. Thereafter, at step S340, the controller 2 obtains the color information of the detected projection image, and then compares the color information of the obtained projection image with that of the original image, before the projection to identify a degree of color variation so that color conversion information through which the original image before the projection is corrected can be evaluated. Then, the controller 2 converts the color of the projection image in accordance the color conversion information at step S360. Thereafter, the controller 2 proceeds to step S370 to perform an operation of projecting the image of which color has been converted.

Figure 5:
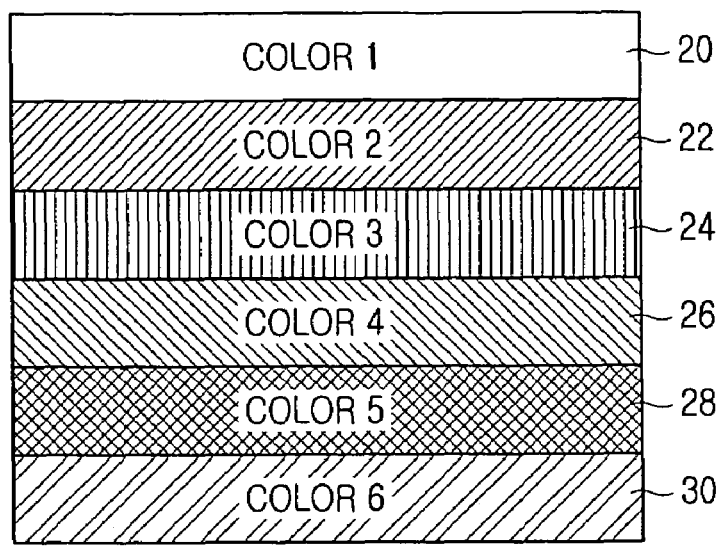
FIG. 5 is a view showing an example of a test image required in obtaining color information in the operation of FIG. 4.

FIG. 5 is a view showing an example of a test image required in obtaining color information in the operation of FIG. 4. Referring to FIG. 5, an example of a test image required for the operation of FIG. 4 will be discussed. The test image shows an image containing a plurality of colors, and may be a configuration in which various colors are displayed in an image. For example, as shown in FIG. 5, the test image may includes a plurality of test color regions, i.e., a first region 20 of a first color, a second region 22 of a second color, a third region 24 of a third color, a fourth region 26 of a fourth region, a fifth region 28 of a fifth color and a sixth region 30 of a sixth color.

Figure 6:
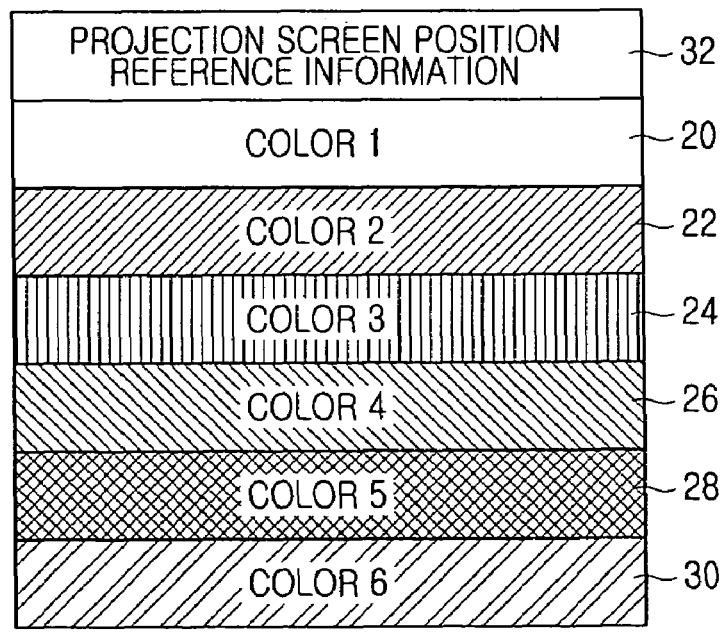
FIG. 6 is a view showing another example of a test image required in obtaining color information in the operation of FIG. 4.

FIG. 6 is a view showing another example of a test image required in obtaining color information in the operation of FIG. 4. Contrary to the test color regions shown in FIG. 5, the test image shown in FIG. 6 includes a projection screen position reference information region 32 that can be a help when searching for the position of the region of a projected image in an image containing the corresponding region of the projected image photographed through a camera. Such a projection screen position reference information region 32 may be another color information, texture information or specific shape information. An example in which the projection screen position reference information region 32 contains texture information of a lattice pattern is shown in FIG. 6.

In the present invention the projected test image is searched in an image containing the corresponding region of the projected image photographed through the camera, and a difference of the colors between the corresponding projected test image and an original test image is identified to calculate proper color conversion information for correcting a projection image. At this time, the test image may include not only one image but also a plurality of test image groups. Here, the difference of the colors between the corresponding projected test image and the original test image can be identified by repeatedly photographing the corresponding projection image through the camera while projecting each of the plurality of test images.

Figure 7:
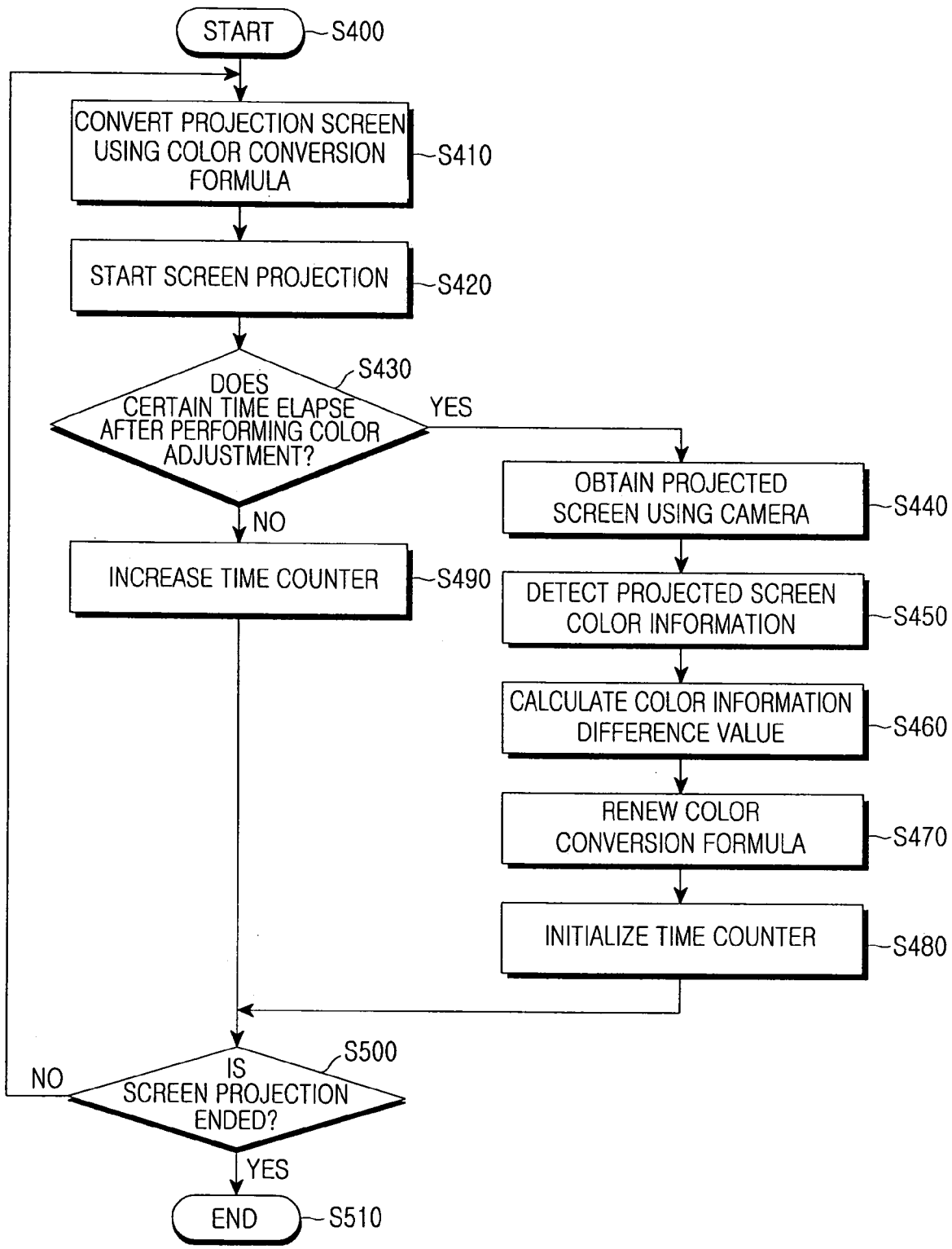
FIG. 7 is a flowchart illustrating an image color adjustment operation of an image projector according to a fourth embodiment of the present invention.

FIG. 7 is a flowchart illustrating an image color adjustment operation of an image projector according to a fourth embodiment of the present invention, in which color adjustment information for projection image color adjustment is renewed at predetermined time intervals during the projection of an image, and the projection image color adjustment is performed to be suitable for a dynamically changing projection environment. That is, as a mobile communication terminal has a characteristic of portability and mobility, there may occur a case of moving while projecting an image. In this case, once color adjustment information is obtained before projecting the image, a difference of the colors between an image to be projected and the projected image may be different from the initial period depending on a change in projection environment in accordance with the movement of the mobile communication terminal. Thus, in FIG. 7, a change in color of the projection image will be adjusted by continuously renewing the projection image color adjustment information while performing the image projection.

More specifically, step S400 is a start step for renewing the projection image conversion information. For convenience of illustration, in a case where the projection image color conversion information is obtained by performing an operation similar to the embodiments shown in FIGS. 3, 4 and the like, it is assumed that an operation of renewing the projection image color conversion information is started at corresponding step S400. If the projection image color conversion information is obtained in such a manner, the controller 2 adjusts the color of an projection image using the obtained projection image color conversion information at step 410. Then, the controller 2 starts projection of such an adjusted image at step S420. Thereafter, the controller 2 identifies whether or not reference time, having been previously set from a time after performing the color adjustment (i.e., after renewing the previous color conversion information), has elapsed at step 430. If the reference time has not elapsed, the controller 2 proceeds to step S490 to continuously increase a time counter, and then proceeds to step S500. Further, after the reference time has elapsed as the identification result of step S430, the controller 2 proceeds to step S440.

The controller 2 obtains the projected image using the camera at step S440, and then detects color information of the obtained projection image at step 450. Thereafter, the controller 2 calculates a difference value from the color of an image expected when projecting an original image using the detected color information of the projection image before projecting the projection image at step S460, and then renews the color conversion information in accordance with the corresponding difference value at step S470. Then, the controller 2 initializes the time counter in order to set a time for renewing the color conversion information step S480, and proceeds to step S500.

At step S500, the controller 2 determines whether or not the image projection operation is ended. If the image projection operation is not ended, the controller proceeds to step S410 to adjust the projection image in accordance with the renewed color conversion information and to repeatedly perform the operation of projecting the image.

Figure 8:
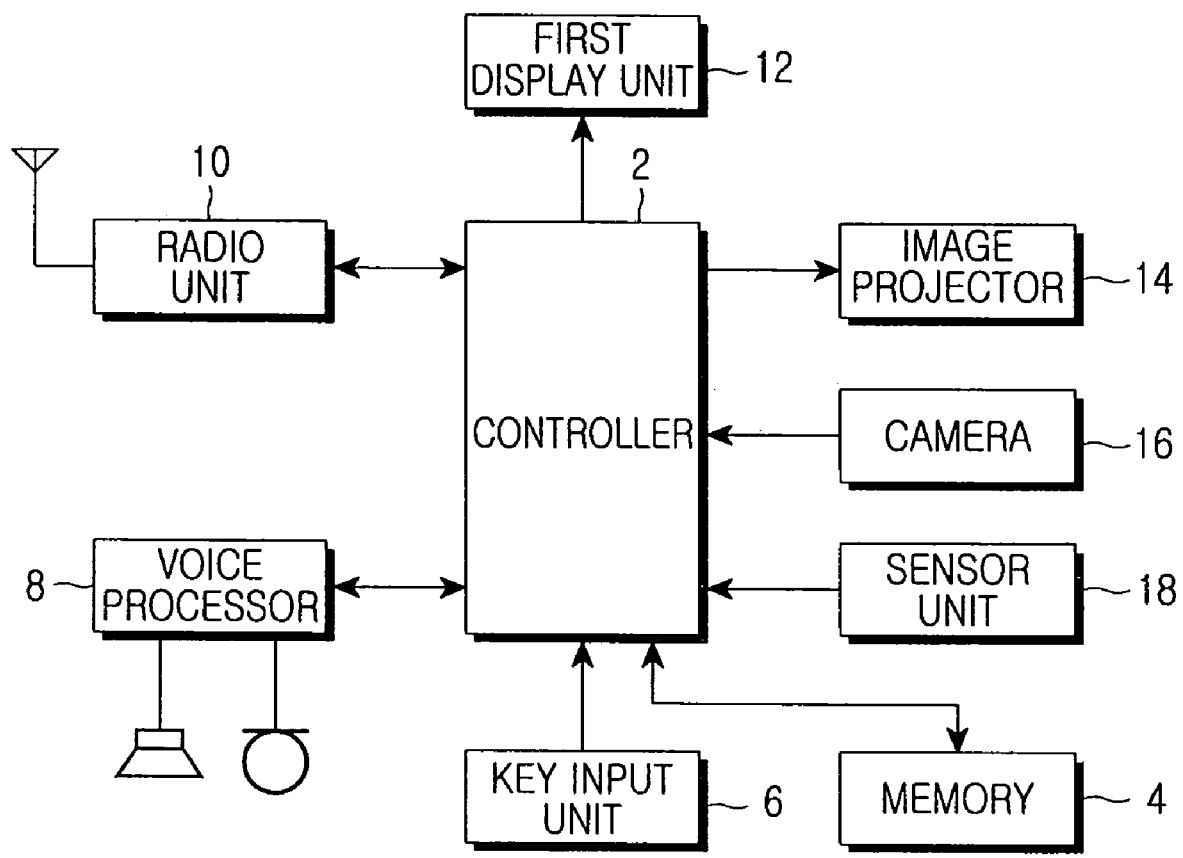
FIG. 8 is a block diagram showing an exemplary configuration of a mobile communication terminal provided with the image projector according to the second embodiment of the present invention.

FIG. 8 is a block diagram showing an exemplary configuration of a mobile communication terminal provided with the image projector according to the another embodiment of the present invention. Alternatively, the mobile communication terminal shown in FIG. 8, according to this embodiment of the present invention, additionally includes a sensor unit 18 in the configuration of the mobile communication terminal shown in FIG. 1 according to the first embodiment of the present invention, and the configuration and operation of the other functional units are the same. The sensor unit 18 may include an illuminance measurement sensor for measuring the illuminance of a projection environment, a distance measurement sensor for measuring a distance to a screen, or the like. In a case where there exists such an alternative sensor in the present invention, an additional color conversion operation is performed using information detected through the sensor.

Figure 9:
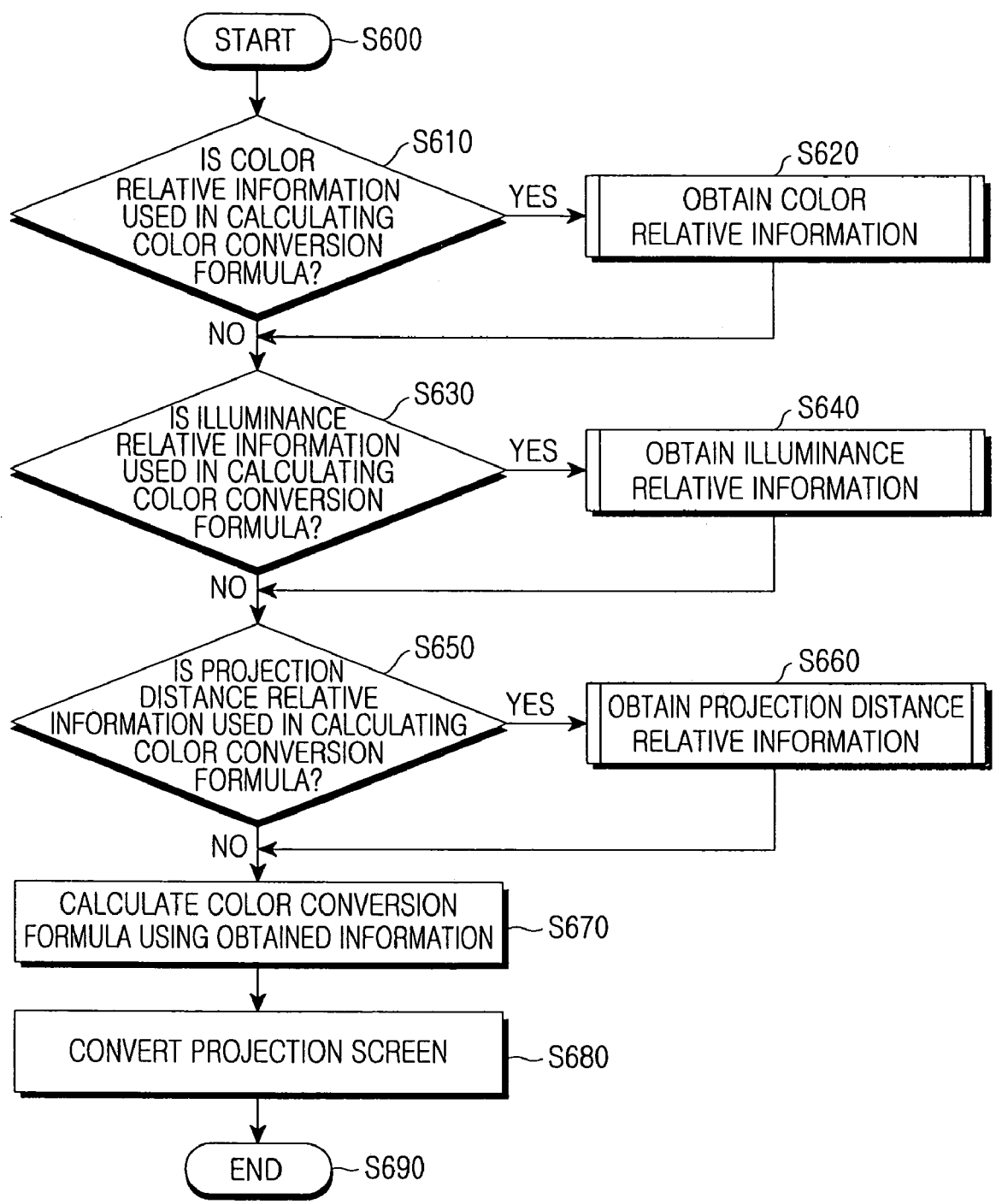
FIG. 9 is a flowchart illustrating an image color adjustment operation of an image projector according to a fifth embodiment of the present invention.

FIG. 9 is a flowchart illustrating an image color adjustment operation of an image projector according to a fifth embodiment of the present invention, in which, when there exists an illuminance sensor or a projection distance measurement sensor, color adjustment is additionally performed using illuminance relative information obtained through the illuminance sensor or projection distance relative information obtained through the projection distance measurement sensor. Referring to FIG. 9, an image projection operation is started at step S600. The controller 2 first identifies whether or not it is previously set to use color relative information when calculating color conversion information at step S610. An operation of processing a setting for the presence of permission to use the color relative information when calculating such color conversion information may be set through a user's operation by appropriately adding it when setting a menu related to image projection in menu setting operations for setting functions of the mobile communication terminal. This can be determined by identifying a setting value through such a user's operation at step S610. If it is set to use the color relative information as the determination result, the controller 2 performs step S620, and then proceeds to step S630. Otherwise, the controller 2 immediately proceeds to step S630. At step S620, the controller 2 performs an operation similar to the operation for obtaining color conversion information in the operations illustrated in FIGS. 2, 3, and 4 to obtain the color relative information.

At step S630, the controller 2 identifies whether or not it is previously set to use illuminance relative information when calculating color conversion information. The identification for the presence of permission to use the illuminance relative information when calculating such color conversion information can be accomplished by previously identifying a value set by the user when setting a menu. If it is set to use the illumination relative information as the identification result, the controller 2 performs step S640, and then proceeds to step S650. Otherwise, the controller 2 immediately proceeds to step S650. At step S640, the controller 2 obtains illuminance relative information of a surrounding environment through the illuminance sensor.

At step S650, the controller 2 identifies whether or not it is previously set to use projection distance relative information when calculating color conversion information. The identification for the presence of permission to use the projection distance relative information can be accomplished by previously identifying a value set by the user when setting a menu. If it is set to use the projection distance relative information as the identification result, the controller 2 performs step S660, and then proceeds to step S670. Otherwise, the controller 2 immediately proceeds to step S670. At step S640, the controller 2 obtains information related to the distance to a screen of the projection image through the illuminance sensor.

At step S670, the controller 2 calculates the color conversion information (color conversion formula) using the obtained information. At this time, since, if the illumination of the surrounding environment is high, the image projected on the screen has a light color as compared with the illumination, the controller 2 calculates the color conversion information such that the color becomes darker. Further, since the image projected on the screen has a light color as the distance to the projection screen is far, the controller 2 calculates the color conversion information such that the color becomes darker. Thereafter, the controller 2 converts the color of the projection image in accordance with the calculated color conversion information at step S680.

As described above, in a method for adjusting an image color in an image projector according to the present invention, the color of an image to be projected is adjusted using color adjustment information, screen color information is obtained through a camera, and the color of an image to be projected is adjusted using the obtained screen color information or a projected image is obtained through the camera, and the color of an image to be projected is adjusted using color information of the obtained projection image and color information of an image before the projection, so that the image projector can effectively obtain information on a projection environment when it projects an image to the outside of the mobile communication terminal and adjust the image using the obtained information, thereby effectively compensating for a phenomenon in which image quality is lowered due to influence on an external projection environment.

For example, although an illuminance sensor is used to obtain illuminance information in the aforementioned description, the illuminance information may be obtained using illuminance information (e.g., an illumination color, a light amount or Lux) obtained through input signal analysis of a camera in the present invention. Further, there may be used brightness information of a projection image obtained using power information of a corresponding mobile communication terminal when obtaining information on a projection environment. Furthermore, although the color of a projection image is entirely converted in accordance with color conversion information in the aforementioned description, an optimal color conversion method may be partially different depending on the state of a screen. Accordingly, the screen region is appropriately divided, and color conversion information on each divided region is obtained, so that the region of the projection image is appropriately divided, and the color of the projection image can be converted using the corresponding color conversion information on each divided region.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for adjusting an image color in an image projector, comprising the steps of:
    obtaining information on an external image projection environment to determine color conversion information for adjusting the color of a projection image; and
    converting the color of an image to be projected using the determined color conversion information to project the image,
    wherein the step of obtaining the information on the external image projection environment comprises the step of obtaining information on a distance to a screen of the projection image,
    wherein the step of converting the color of the image to be projected comprises the step of adjusting the color of the image to be darker as the distance to the screen is farther, according to the obtained distance information.

2. The method as claimed in claim 1, wherein the step of obtaining the information on the external image projection environment comprises the step of:
    obtaining the color of a screen region on which an image is to be projected through a camera while any image is not projected.

3. The method as claimed in claim 1, wherein obtaining the information on the external image projection environment comprises the step of:
    obtaining a projected image through a camera, and comparing the color of the obtained projection image with that of a projected original image.

4. The method as claimed in claim 3, wherein the projection image obtained through the camera is a real picture.

5. The method as claimed in claim 3, wherein the projection image obtained through the camera is at least one test image with at least one preset test color region.

6. The method as claimed in claim 5, wherein the test image includes a position reference information region in which information for identifying the position of the test image is displayed.

7. The method as claimed in claim 1, wherein obtaining information regarding the external image projection environment to determine color conversion information for adjusting the color of the projection image and converting the color of the image to be projected using the determined color conversion information to project the image are repeatedly performed in a preset period by performing a time counter during the image projection operation.

8. The method as claimed in claim 1, wherein obtaining the information on the external image projection environment comprises of the step of: obtaining external illuminance information.

9. A method for adjusting an image color in an image projector, comprising the steps of:
- determining color conversion information for adjusting the color of a projection image using information having been previously input by a user and information on an external image projection environment; and
- converting the color of an image to be projected using the determined color conversion information to project the image,
- wherein the information on the external image projection environment comprises information on a distance to a screen of the projection imam
- wherein the step of converting the color of the image to be projected comprises the step of adjusting the color of the image to be darker as the distance to the screen is farther, according to the information on the distance.

10. The method as claimed in claim 9, wherein the information having been previously input by the user is that of a plurality of colors possible for color conversion selected by the user, and conversion values of the selected colors are input by the user.

11. The method as claimed in claim 9, wherein the information regarding sets of setting values of a plurality of preset colors are provided to be displayed, and one of the displayed sets is selected by the user.

12. The method as claimed in claim 9, wherein the information regarding a plurality of proper color setting information are displayed such that corrections of colors corresponding to a plurality of projection environments are accomplished, and one of the displayed color settings is selected by the user.

13. The method as claimed in claim 9, wherein determining color conversion information for adjusting the color of the projection image using information having been previously input by the user and information on the external image projection environment further comprises the step of:
- obtaining the color of a region on which an image is projected through a camera.

14. The method as claimed in claim 9, wherein determining color conversion information for adjusting the color of the projection image using information having been previously input by the user and information on the external image projection environment further comprises the step of:
- obtaining a projected image through a camera, and comparing the color of the obtained projection image with that of a projected original image.

15. A device for adjusting a projection image color in a mobile communication terminal provided with an image projector, comprising:
- an image projector for performing an image projection function under the control of a controller;
- a camera for performing a camera function under the control of the controller; and
- the controller for obtaining color information of an external screen on which an image is to be projected through the camera while any image is not projected, and adjusting the color of an image to be projected onto the image projector using the color information.

16. The device as claimed in claim 15, further comprising a sensor unit having at least one of an illuminance sensor capable of measuring the illuminance of a projection environment or a distance measurement sensor capable of measuring the distance to a screen,
- wherein the controller adjusts the color of an image to be projected through the image projector additionally using illuminance information and/or distance information input through the sensor unit.

17. A device for adjusting a projection image color in a mobile communication terminal provided with an image projector, comprising:
- an image projector for performing an image projection function under the control of a controller;
- a camera for performing a camera function under the control of the controller; and
- the controller for obtaining color information of an image projected by the image projector through the camera, and adjusting the color of an image to be projected onto the image projector using the color information, and
- a sensor unit having a distance measurement sensor capable of measuring a distance to a screen,
- wherein the controller adjusts the color of the image to be projected onto the image projector in a manner that adjusts it to be darker as the distance to the screen is farther, additionally using distance information input through the sensor unit.

18. The device as claimed in claim 17, wherein the sensor unit further has an illuminance sensor capable of measuring the illuminance of a projection environment,
- wherein the controller adjusts the color of an image to be projected through the image projector additionally using illuminance information input through the sensor unit.

* * * * *